US007107487B2

(12) United States Patent
Ahmad et al.

(10) Patent No.: US 7,107,487 B2
(45) Date of Patent: Sep. 12, 2006

(54) FAULT TOLERANT SLEEP MODE OF OPERATION

(75) Inventors: Nazir Haroon Ahmad, Raleigh, NC (US); Ameha Aklilu, Chapel Hill, NC (US); Jordan Hsiao Ping Chin, Cary, NC (US); Richard Alan Dayan, Wake Forest, NC (US); James Patrick Hoff, Raleigh, NC (US); Eric Richard Kern, Durham, NC (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 914 days.

(21) Appl. No.: 10/122,251

(22) Filed: Apr. 12, 2002

(65) Prior Publication Data

US 2003/0196137 A1 Oct. 16, 2003

(51) Int. Cl.
*G06F 11/00* (2006.01)
(52) U.S. Cl. .......................................... 714/24; 714/21
(58) Field of Classification Search .................. 714/24, 714/21, 15
See application file for complete search history.

(56) References Cited

U.S. PATENT DOCUMENTS

| 6,145,068 A | 11/2000 | Lewis | ........................ 711/170 |
| 6,243,831 B1 | 6/2001 | Mustafa et al. | ................ 714/24 |
| 6,247,151 B1 * | 6/2001 | Poisner | ........................ 714/718 |
| 6,389,556 B1 * | 5/2002 | Qureshi | ........................ 714/15 |
| 6,457,136 B1 * | 9/2002 | Sugiura | ........................ 713/340 |
| 6,694,451 B1 * | 2/2004 | Atkinson | ........................ 714/15 |

OTHER PUBLICATIONS

Wikipedia, Cyclic Redundancy Check, No Date Given, http://en.wikipedia.org/wiki.*

* cited by examiner

*Primary Examiner*—Robert Beausoliel
*Assistant Examiner*—Marc Duncan
(74) *Attorney, Agent, or Firm*—Robert A. Voigt, Jr.; Winstead Sechrest & Minick, P.C.

(57) ABSTRACT

A method, system and computer program product for implementing a fault tolerant sleep mode of operation. The system state information may be stored in a volatile memory and in a non-volatile storage unit prior to entering the sleep mode of operation. If a memory corruption event, e.g., power outage, brownout, power surge, occurs during the sleep mode of operation, then, upon receiving an invocation to resume to a normal mode of operation, the system state information stored in the non-volatile storage unit may be reloaded into the volatile memory. By reloading the system state information stored in the non-volatile storage into the volatile memory, the computer system may resume to a normal mode of operation from a sleep mode of operation without any corruption or loss of data.

20 Claims, 2 Drawing Sheets

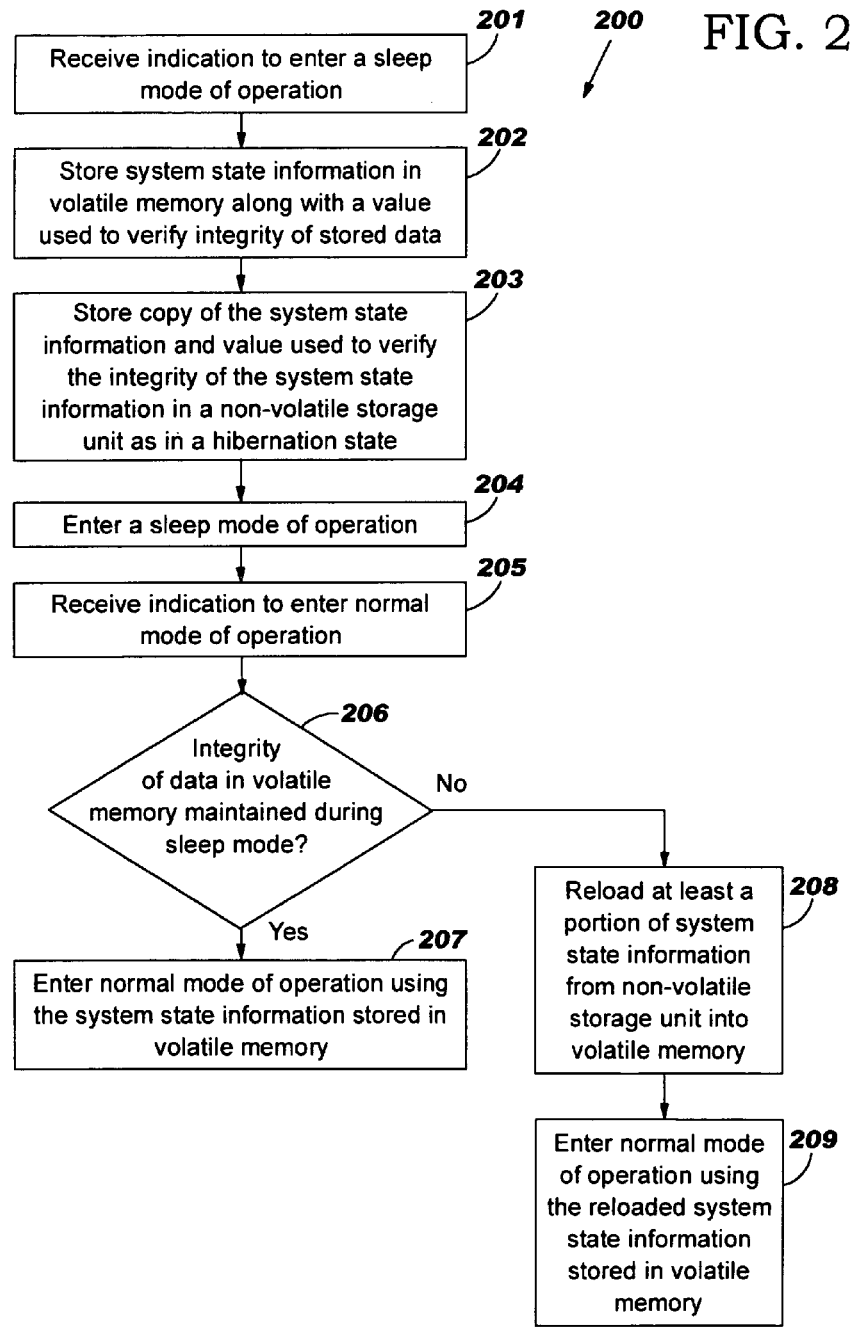

FAULT TOLERANT SLEEP MODE OF OPERATION

TECHNICAL FIELD

The present invention relates to the field of computer systems, and more particularly to a computer system able to enter a normal mode of operation from a sleep mode of operation without any corruption or loss of data if a memory corruption event, e.g., power outages, brownouts, power surges, occurs.

BACKGROUND INFORMATION

Computer systems, including desktop, portable computers, may operate in a power saving mode of operation in order to reduce power consumption. One such power saving mode of operation may be referred to as "sleep mode." A computer system may be invoked to enter a sleep mode of operation after a period of inactivity or upon a user invoking the computer system to enter the sleep mode of operation. Upon entering the sleep mode of operation, the state of the system may be stored in volatile memory, e.g., Random Access Memory (RAM). For example, register contents storing system state information may be stored in volatile memory during the sleep mode of operation. The "sleeping" computer system may be "awakened" or resumed upon an event such as a user's keystroke, receipt of electronic mail, a fax, etc. That is, upon an awakening event, the computer system exits out of the sleep mode of operation and resumes a normal mode of operation.

Another power saving mode of operation may be referred to as "hibernation." A computer system may similarly be invoked into hibernation as invoking the sleep mode of operation. However, upon entering hibernation, the computer system stores the contents of the system state information in a non-volatile storage unit, e.g., disk drive, flash Read Only Memory (ROM), as opposed to storing the system state information in volatile memory. A computer system operating in hibernation may similarly be awakened as awakening the computer system operating in sleep mode.

A disadvantage of a computer system operating in hibernation than in sleep mode is that it takes longer for the computer system to enter a normal mode of operation. As stated above, the system state information may be stored in a non-volatile storage unit during hibernation. Upon the computer system operating in hibernation being awakened, the system state information must first be reloaded into volatile memory involving latencies such as mechanical latencies for hard drive accesses. In contrast, the computer system operating in sleep mode may resume normal operation faster since the system state information is already stored in volatile memory.

However, a disadvantage with storing system state information in volatile memory in sleep mode is that the information may be corrupted or lost upon occurrence of a memory corruption event, e.g., power outages, brownouts, power surges. As volatile memory requires continuous power to hold data, any data contained in volatile memory may be corrupted or lost during a memory corruption event such as a power reduction, however fleeting the power loss may be.

Since a computer system operating in sleep mode may resume to a normal operating mode faster than a computer system operating in hibernation, it would be desirable to enter the sleep mode of operation as a power saving mode of operation. However, as stated above, system state information may be corrupted or lost upon occurrence of a memory corruption event during sleep mode.

It would therefore be desirable for a computer system to be able to enter a normal mode of operation from a sleep mode of operation without any corruption or loss of data if a memory corruption event, e.g., power outages, brownouts, power surges, occurs.

SUMMARY

The problems outlined above may at least in part be solved in some embodiments by storing a copy of the system state information in a nonvolatile storage unit, e.g., disk unit, in conjunction with storing the system state information in volatile memory prior to entering the sleep mode of operation. If a memory corruption event, e.g., power outage, brownout, power surge, occurs during the sleep mode of operation, then upon receiving an invocation to resume to a normal mode of operation, the system state information stored in the non-volatile storage unit may be reloaded into the volatile memory. By reloading the system state information stored in the nonvolatile storage into the volatile memory, the computer system may resume to a normal mode of operation from a sleep mode of operation without any corruption or loss of data.

In one embodiment of the present invention, a method for implementing a fault tolerant sleep mode of operation may comprise the step of a computer system receiving an indication to enter a sleep mode of operation. The system state information may be stored in one or more memory pages in a volatile memory along with a value used to verify the integrity of the stored system state information. Furthermore, a copy of the system state information and value used to verify the integrity of the system state information may be stored in a paging area in a non-volatile storage unit, e.g., disk unit, Read Only Memory (ROM), as in a hibernation mode of operation. The computer system may then enter a sleep mode of operation.

The computer system may then receive an indication to resume to a normal mode of operation. For example, the computer system may receive an indication to resume to a normal mode of operation by an invocation of a user's keystroke, receipt of electronic mail, a fax, etc.

A determination may then be made by the computer system as to whether the integrity of the system state information store in volatile memory was maintained during sleep mode. If the integrity of the system state information was maintained during the sleep mode of operation, then the computer system may enter a normal mode of operation using the system state information stored in volatile memory.

However, if the integrity of at least a portion of the system state information was not maintained during the sleep mode of operation, then at least a portion of system state information may have been corrupted or loss due to a memory corruption event, e.g., power outage, brownout, power surge. Further, if the integrity of at least a portion of the system state information was not maintained during the sleep mode of operation, then at least the portion of system state information that was corrupted or lost may be reloaded from the non-volatile storage unit into the volatile memory. That is, at least the portion of system state information that was corrupted or lost may be reloaded from the non-volatile storage unit into the volatile memory as resuming to a normal mode of operation from the hibernation state. By reloading uncorrupted system state information from the non-volatile storage unit to the volatile memory if a memory corruption event occurs, the computer system may enter a normal mode of operation from the sleep mode of operation without any corruption or loss of data if a memory corruption event occurs. That is, by reloading uncorrupted system state information from the non-volatile storage unit to the volatile memory if a memory corruption event occurs, the computer system may implement a fault tolerant sleep mode of operation. The computer system may then enter a normal mode of operation using the reloaded system state information stored in volatile memory. The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 2 is a flowchart of a method for implementing a fault tolerant sleep mode of operation in accordance with the present invention.

DETAILED DESCRIPTION

FIG. 1—Hardware Configuration of Computer System

Figure 1:
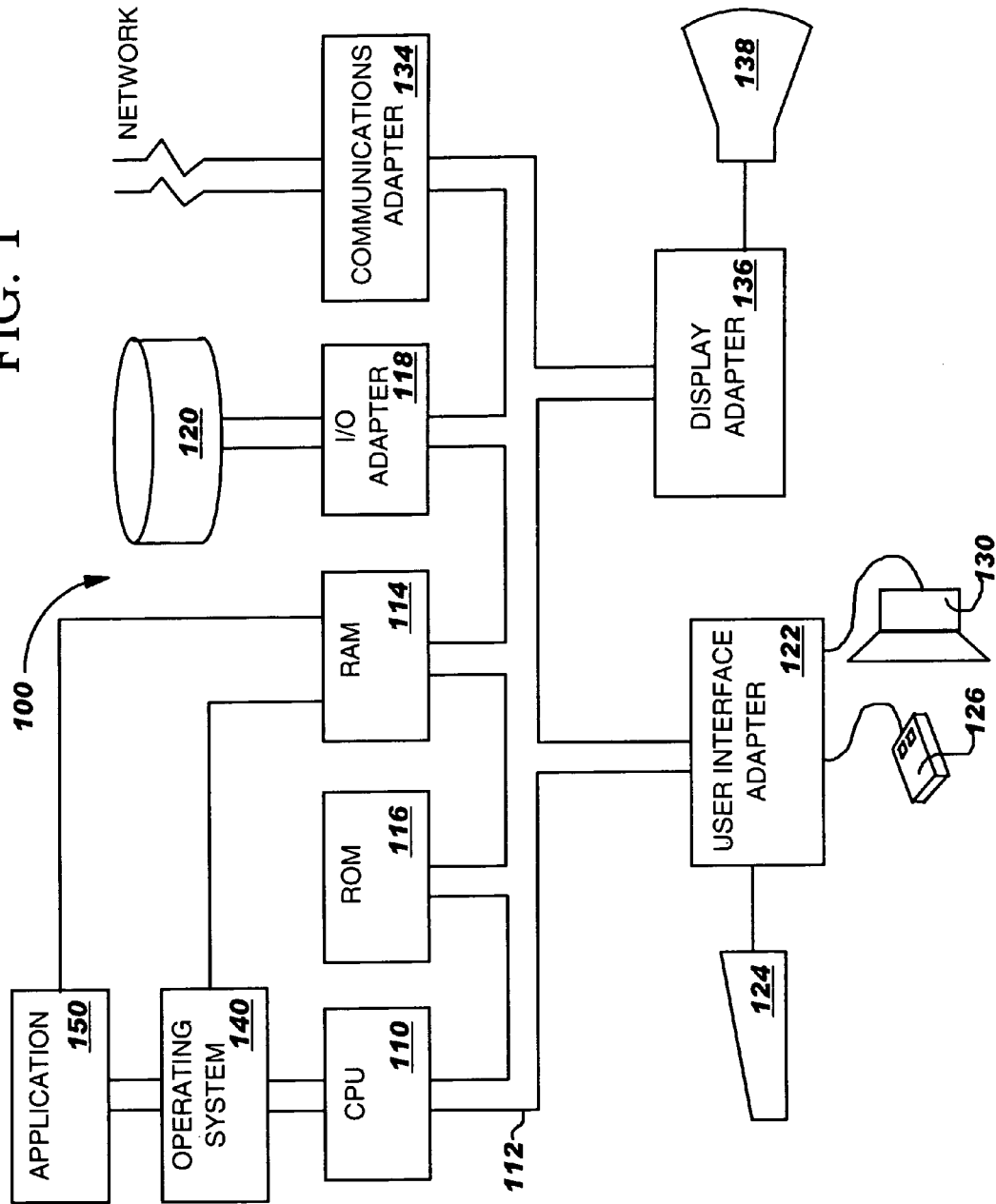
FIG. 1 illustrates a hardware configuration of a computer system configured in accordance with the present invention.

FIG. 1 illustrates a typical hardware configuration of computer system 100 which is representative of a hardware environment for practicing the present invention. Computer system 100 may be any type of device, e.g., wireless, Personal Digital Assistant (PDA), portable computer system, cell phone, personal computer system, workstation, Internet appliance, configured with the capability of entering a sleep mode of operation. It is noted that the depicted example in FIG. 1 and the below-described example are not meant to imply architectural limitations. It is further noted that those skilled in the art will appreciate that the hardware depicted in FIG. 1 may vary depending on the type of device of computer system 100.

Referring to FIG. 1, computer system 100 may have a central processing unit (CPU) 110 coupled to various other components by system bus 112. An operating system 140, may run on CPU 110 and provide control and coordinate the functions of the various components of FIG. 1. An application 150 in accordance with the principles of the present invention may run in conjunction with operating system 140 and provide calls to operating system 140 where the calls implement the various functions or services to be performed by application 150. Application 150 may include, for example, a program for enabling a computer system to enter a normal mode of operation from a sleep mode of operation without any corruption or loss of data if a memory corruption event, e.g., power outages, brownouts, power surges, occurs as discussed in FIG. 2. Read only memory (ROM) 116 may be coupled to system bus 112 and include a basic input/output system ("BIOS") that controls certain basic functions of computer system 100. Random access memory (RAM) 114 and Input/Output (I/O) adapter 118 may also be coupled to system bus 112. It should be noted that software components including operating system 140 and application 150 may be loaded into RAM 114 which may be the computer system's main memory. I/O adapter 118 may be a small computer system interface ("SCSI") adapter that communicates with a disk unit 120, e.g., disk drive. It is noted that the program of the present invention that enables a computer system to enter a normal mode of operation from a sleep mode of operation without any corruption or loss of data if a memory corruption event, e.g., power outages, brownouts, power surges, occurs, as discussed in FIG. 2, may reside in disk unit 120 or in application 150.

Returning to FIG. 1, communications adapter 134 may also be coupled to system bus 112. Communications adapter 134 may interconnect bus 112 with an outside network, e.g., Local Area Network (LAN), Wide Area Network (WAN), enabling computer system 100 to communicate with other such systems. Input/Output devices may also be connected to system bus 112 via a user interface adapter 122 and a display adapter 136. Keyboard 124, mouse 126 and speaker 130 may all be interconnected to bus 112 through user interface adapter 122. Event data may be inputted to computer system 100 through any of these devices. A display monitor 138 may be connected to system bus 112 by display adapter 136. In this manner, a user is capable of inputting, e.g., invoking computer system 100 to enter a sleep mode of operation, invoking computer system 100 to resume a normal mode of operation, to computer system 100 through keyboard 124 or mouse 126 and receiving output from computer system 100 via display 138 or speaker 130.

Implementations of the invention include implementations as a computer system programmed to execute the method or methods described herein, and as a computer program product. According to the computer system implementations, sets of instructions for executing the method or methods may be resident in the random access memory 114 of one or more computer systems configured generally as described above. Until required by computer system 100, the set of instructions may be stored as a computer program product in another computer memory, for example, in disk unit 120. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

FIG. 2—Method for Implementing a Fault Tolerant Sleep Mode of Operation

FIG. 2 is a flowchart of one embodiment of the present invention of a method 200 for implementing a fault tolerant sleep mode of operation. That is, FIG. 2 is a flowchart of one embodiment of the present invention of a method 200 for enabling a computer system to enter a normal mode of operation from a sleep mode of operation without any corruption or loss of data if a memory corruption event, e.g., power outages, brownouts, power surges, occurs. As stated in the Background Information section, a disadvantage with storing system state information in volatile memory in sleep mode is that the information may be corrupted or lost upon occurrence of a memory corruption event, e.g., power outages, brownouts, power surges. As volatile memory requires continuous power to hold data, any data contained in volatile memory may be corrupted or lost during a memory corruption event such as a power reduction, however fleeting the power loss may be. Since a computer system operating in sleep mode may resume to a normal operating mode faster than a computer system operating in hibernation, it would be desirable to enter the sleep mode of operation as a power saving mode of operation. However, as stated above, system state information may be corrupted or lost upon occurrence of a memory corruption event during sleep mode. It would therefore be desirable for a computer system to be able to enter a normal mode of operation from a sleep mode of operation without any corruption or loss of data if a memory corruption event, e.g., power outages, brownouts, power surges, occurs. Method 200 is a method for enabling a computer system to enter a normal mode of operation from a sleep mode of operation without any corruption or loss of data if a memory corruption event, e.g., power outages, brownouts, power surges, occurs.

In step 202, system state information may be stored in one or more memory pages in volatile memory, e.g., RAM 114, along with a value used to verify the integrity of the stored system state information. System state information may refer to data regarding the state of computer system 100. Such information may typically be stored in the various chipset and hardware registers (not shown in FIG. 1) in computer system 100. In one embodiment, the value used to verify the integrity of the stored system state information may be a value produced by performing a hash function on the system state information. In another embodiment, the value used to verify the integrity of the stored system state information may be a value produced by performing a checksum function on the system state information. It is noted that there are other means for verifying the integrity of data that would be recognized by an artisan of ordinary skill in the art. It is further noted that embodiments employing such means would fall within the scope of the present invention.

In step 203, a copy of the system state information and value used to verify the integrity of the system state information may be stored in a paging area in a non-volatile storage unit, e.g., disk unit 120, ROM 116, as in a hibernation mode of operation. As stated in the Background Information, "hibernation" may be a power saving mode of operation that stores system state information in a non-volatile storage unit.

In step 204, computer system 100 may enter a sleep mode of operation. In step 205, computer system 100 may receive an indication to resume to a normal mode of operation. For example, computer system 100 may receive an indication to resume to a normal mode of operation by an invocation of a user's keystroke, receipt of electronic mail, a fax, etc.

In step 206, a determination may be made by computer system 100 as to whether the integrity of the system state information store in volatile memory, e.g., RAM 114, was maintained during sleep mode. In one embodiment, if the value stored in volatile memory, e.g., RAM 114, was produced by performing a hash function on the system state information, then the determination of step 206 may be accomplished by generating a new hash value. The new hash value may be generated using the same hash function as the hash function that generated the value stored in volatile memory, e.g., RAM 114, in step 202. Upon generating the new hash value, a comparison may be made between the new hash value and the value stored in volatile memory, e.g., RAM 114. If the new hash value and the value stored in volatile memory, e.g., RAM 114, are the same, then the integrity of the system state information was maintained during the sleep mode. However, if the new hash value and the value stored in volatile memory, e.g., RAM 114, differ, then the data in one or more memory pages may be corrupted or lost from a memory corruption event, e.g., power outage, brownout, power surge. That is, if the new hash value and the value stored in volatile memory, e.g., RAM 114, differ, then at least a portion of the system state information stored in volatile memory, e.g., RAM 114, may be corrupted or lost from a memory corruption event. Similarly, in another embodiment, if the value stored in volatile memory, e.g., RAM 114, was produced by performing a checksum function on the system state information, then the determination of step 206 may be accomplished by generating a new checksum value. The new checksum value may be generated using the same checksum function as the checksum function that generated the value stored in volatile memory, e.g., RAM 114, in step 202. Upon generating the new checksum value, a comparison may be made between the new checksum value and the value stored in volatile memory, e.g., RAM 114. If the new checksum value and the value stored in volatile memory, e.g., RAM 114, are the same, then the integrity of the system state information was maintained during the sleep mode. However, if the new checksum value and the value stored in volatile memory, e.g., RAM 114, differ, then the data in one or more memory pages may be corrupted or lost from a memory corruption event, e.g., power outage, brownout, power surge. That is, if the new checksum value and the value stored in volatile memory, e.g., RAM 114, differ, then at least a portion of the system state information stored in volatile memory, e.g., RAM 114, may be corrupted or lost from a memory corruption event. It is noted that there are other means for determining whether the integrity of system state information was maintained during the sleep mode and that such means would be recognized by an artisan of ordinary skill in the art. It is further noted that embodiments employing such means would fall within the scope of the present invention.

Referring to step 206, if the integrity of the system state information was maintained during the sleep mode of operation, then, in step 207, computer system 100 may enter a normal mode of operation using the system state information stored in volatile memory, e.g., RAM 114.

However, if the integrity of at least a portion of the system state information was not maintained during the sleep mode of operation, then, in step 208, at least the portion of system state information that was corrupted or lost may be reloaded from the non-volatile storage unit, e.g., disk unit 120, ROM 116, into the volatile memory, e.g., RAM 114. That is, at least the portion of system state information that was corrupted or lost may be reloaded from the non-volatile storage unit, e.g., disk unit 120, ROM 116, into the volatile memory, e.g., RAM 114, as resuming to a normal mode of operation from the hibernation state. By reloading uncorrupted system state information from the non-volatile storage unit, e.g., disk unit 120, to the volatile memory, e.g., RAM 114, if a memory corruption event occurs, computer system 100 may enter a normal mode of operation from the sleep mode of operation without any corruption or loss of data if a memory corruption event occurs. That is, by reloading uncorrupted system state information from the non-volatile storage unit to the volatile memory, e.g., RAM 114, if a memory corruption event occurs, computer system 100 may implement a fault tolerant sleep mode of operation. It is noted for clarity purposes that the entire system state information stored in the non-volatile storage unit, e.g., disk unit 120, ROM 116, may be reloaded into the volatile memory, e.g., RAM 114.

In step 209, computer system 100 may enter a normal mode of operation using the reloaded system state information stored in volatile memory, e.g., RAM 114.

It is noted that method 200 may be executed in a different order presented and that the order presented in the discussion of FIG. 2 is illustrative. It is further noted that certain steps in method 200 may be executed almost concurrently. Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for implementing a fault tolerant sleep mode of operation comprising the steps of:
   storing system state information and a value used to verify integrity of said system state information in a volatile memory;
   storing a copy of said system state information and said value used to verify integrity of said system state information in a non-volatile storage unit;
   entering said sleep mode of operation;
   receiving an indication to enter a normal mode of operation; and
   determining if integrity of said system state information stored in said volatile memory is maintained, wherein if said integrity of at least a portion of said system state information in said volatile memory is not maintained then the method further comprises the step of:
      reloading at least said portion of said system state information stored in said non-volatile storage unit into said volatile memory.

2. The method as recited in claim 1, wherein if said integrity of at least a portion of said system state information in said volatile memory is not maintained then the method further comprises the step of:
   entering said normal mode of operation using said reloaded system state information stored in said volatile memory.

3. The method as recited in claim 1, wherein if said integrity of said system state information in said volatile memory is maintained then the method further comprises the step of:
   entering said normal mode of operation using said system state information stored in said volatile memory.

4. The method as recited in claim 1, wherein integrity of said system state information stored in said volatile memory is determined by performing a hash function on said system state information stored in said volatile memory and comparing a value produced by said hash function with said value stored in said volatile memory.

5. The method as recited in claim 1, wherein integrity of said system state information stored in said volatile memory is determined by performing a checksum function on said system state information stored in said volatile memory and comparing a value produced by said checksum function with said value stored in said volatile memory.

6. A computer program product embodied in a machine readable medium for implementing a fault tolerant sleep mode of operation comprising the programming steps of:
   storing system state information and a value used to verify integrity of said system state information in a volatile memory;
   storing a copy of said system state information and said value used to verify integrity of said system state information in a non-volatile storage unit;
   entering said sleep mode of operation;
   receiving an indication to enter a normal mode of operation; and
   determining if integrity of said system state information stored in said volatile memory is maintained, wherein if said integrity of at least a portion of said system state information in said volatile memory is not maintained then the method further comprises the step of:
      reloading at least a portion of said system state information stored in said non-volatile storage unit into said volatile memory.

7. The computer program product as recited in claim 6, wherein if said integrity of at least a portion of said system state information in said volatile memory is not maintained then the computer program product further comprises the programming step of:
   entering said normal mode of operation using said reloaded system state information stored in said volatile memory.

8. The computer program product as recited in claim 6, wherein if said integrity of said system state information in said volatile memory is maintained then the computer program product further comprises the programming step of:
   entering said normal mode of operation using said system state information stored in said volatile memory.

9. The computer program product as recited in claim 6, wherein integrity of said system state information stored in said volatile memory is determined by performing a hash function on said system state information stored in said volatile memory and comparing a value produced by said hash function with said value stored in said volatile memory.

10. The computer program product as recited in claim 6, wherein integrity of said system state information stored in said volatile memory is determined by performing a checksum function on said system state information stored in said volatile memory and comparing a value produced by said checksum function with said value stored in said volatile memory.

11. A system, comprising:
   a memory unit operable for storing a computer program operable for implementing a fault tolerant sleep mode of operation; and
   a processor coupled to said memory unit, wherein said processor, responsive to said computer program, comprises:
      circuitry operable for storing system state information and a value used to verify integrity of said system state information in a volatile memory;
      circuitry operable for storing a copy of said system state information and said value used to verify integrity of said system state information in a non-volatile storage unit;
      circuitry operable for entering said sleep mode of operation;
      circuitry operable for receiving an indication to enter a normal mode of operation; and
      circuitry operable for determining if integrity of said system state information stored in said volatile memory is maintained, wherein if said integrity of at least a portion of said system state information in said volatile memory is not maintained then said processor further comprises:
         circuitry operable for reloading at least a portion of said system state information stored in said non-volatile storage unit into said volatile memory.

12. The system as recited in claim 11, wherein if said integrity of at least a portion of said system state information in said volatile memory is not maintained then said processor further comprises:
   circuitry operable for entering said normal mode of operation using said reloaded system state information stored in said volatile memory.

13. The system as recited in claim 11, wherein if said integrity of said system state information in said volatile memory is maintained then said processor further comprises:
   circuitry operable for entering said normal mode of operation using said system state information stored in said volatile memory.

14. The system as recited in claim 11, wherein integrity of said system state information stored in said volatile memory is determined by performing a hash function on said system state information stored in said volatile memory and comparing a value produced by said hash function with said value stored in said volatile memory.

15. The system as recited in claim 11, wherein integrity of said system state information stored in said volatile memory is determined by performing a checksum function on said system state information stored in said volatile memory and comparing a value produced by said checksum function with said value stored in said volatile memory.

16. A system, comprising:
   means for storing system state information and a value used to verify integrity of said system state information in a volatile memory;
   means for storing a copy of said system state information and said value used to verify integrity of said system state information in a non-volatile storage unit;
   means for entering said sleep mode of operation;
   means for receiving an indication to enter a normal mode of operation; and
   means for determining if integrity of said system state information stored in said volatile memory is maintained, wherein if said integrity of at least a portion of said system state information in said volatile memory is not maintained then the system further comprises:
   means for reloading at least a portion of said system state information stored in said non-volatile storage unit into said volatile memory.

17. The system as recited in claim 16, wherein if said integrity of at least a portion of said system state information in said volatile memory is not maintained then the system further comprises:
   means for entering said normal mode of operation using said reloaded system state information stored in said volatile memory.

18. The system as recited in claim 16, wherein if said integrity of said system state information in said volatile memory is maintained then the system further comprises:
   means for entering said normal mode of operation using said system state information stored in said volatile memory.

19. The system as recited in claim 16, wherein integrity of said system state information stored in said volatile memory is determined by performing a hash function on said system state information stored in said volatile memory and comparing a value produced by said hash function with said value stored in said volatile memory.

20. The system as recited in claim 16, wherein integrity of said system state information stored in said volatile memory is determined by performing a checksum function on said system state information stored in said volatile memory and comparing a value produced by said checksum function with said value stored in said volatile memory.

* * * * *